(12) United States Patent
Shioiri et al.

(10) Patent No.: US 10,030,720 B2
(45) Date of Patent: Jul. 24, 2018

(54) SELECTABLE ONE-WAY CLUTCH

(71) Applicants: TOYOTA JIDOSHA KABUSHIKI KAISHA, Toyota-shi, Aichi (JP); MEANS INDUSTRIES, INC., Saginaw, MI (US)

(72) Inventors: Hiroyuki Shioiri, Yokohama (JP); Hideaki Komada, Gotemba (JP); Yuki Kurosaki, Susono (JP); Hiroyuki Shibata, Odawara (JP); Brice A. Pawley, Midland, MI (US)

(73) Assignees: TOYOTA JIDOSHA KABUSHIKI KAISHA, Toyota-shi (JP); MEANS INDUSTRIES, INC., Saginaw, MI (US)

( * ) Notice: Subject to any disclaimer, the term of this patent is extended or adjusted under 35 U.S.C. 154(b) by 199 days.

(21) Appl. No.: 15/017,936

(22) Filed: Feb. 8, 2016

(65) Prior Publication Data
US 2016/0230819 A1    Aug. 11, 2016

(30) Foreign Application Priority Data
Feb. 10, 2015    (JP) ................. 2015-023858

(51) Int. Cl.
*F16D 41/14*    (2006.01)
*F16D 41/12*    (2006.01)

(52) U.S. Cl.
CPC .......... *F16D 41/14* (2013.01); *F16D 41/125* (2013.01)

(58) Field of Classification Search
CPC ................. F16D 41/125; F16D 41/14; F16D 2125/20–2125/42; F16D 2500/10493
See application file for complete search history.

(56) References Cited

U.S. PATENT DOCUMENTS

| | | |
|---|---|---|
| 6,244,965 B1 | 6/2001 | Klecker et al. |
| 7,258,214 B2 | 8/2007 | Pawley et al. |
| 7,344,010 B2 | 3/2008 | Fetting, Jr. et al. |
| 7,484,605 B2 | 2/2009 | Pawley et al. |
| 8,051,959 B2 | 11/2011 | Eisengruber |
| 8,079,453 B2 | 12/2011 | Kimes |
| 8,272,488 B2 | 9/2012 | Eisengruber et al. |
| 8,602,187 B2 | 12/2013 | Prout |
| 8,844,693 B2 | 9/2014 | Pawley |

(Continued)

FOREIGN PATENT DOCUMENTS

JP    4887941 B2    2/2012

*Primary Examiner* — Richard M Lorence
(74) *Attorney, Agent, or Firm* — Hunton Andrews Kurth LLP (57) ABSTRACT

A selectable one-way clutch is provided. The selectable one-way clutch comprises a selector member rotated at a predetermined angle between an engagement position and a disengagement position, and an actuator that reciprocates linearly along a tangential line of the selector member to rotate the selector member to the engagement position and to the disengagement position. The actuator comprises an actuation member that is offset from the selector member in a direction along a rotational center axis of the selector member to actuate along the tangential line of the circumference of the selector member. The selectable one-way clutch further comprises an arm connecting the actuation member and the selector member to rotate the selector member by a linear motion of the actuation member.

7 Claims, 8 Drawing Sheets

(56) References Cited

U.S. PATENT DOCUMENTS

| | | |
|---|---|---|
| 9,121,454 B2 | 9/2015 | Pawley |
| 9,188,170 B2 | 11/2015 | Prout et al. |
| 9,188,174 B2 | 11/2015 | Beiser et al. |
| 9,377,061 B2 | 6/2016 | Kimes et al. |
| 2008/0000747 A1 | 1/2008 | Saka |
| 2009/0005212 A1* | 1/2009 | Maguire ............... F16D 41/125 475/323 |
| 2009/0194381 A1 | 8/2009 | Samie et al. |
| 2010/0018795 A1 | 1/2010 | Samie et al. |
| 2010/0255954 A1 | 10/2010 | Samie et al. |
| 2012/0090952 A1 | 4/2012 | Lee et al. |
| 2015/0105205 A1* | 4/2015 | Kurosaki ............... B60K 6/445 475/5 |
| 2015/0211587 A1 | 7/2015 | Kimes et al. |
| 2016/0129864 A1 | 5/2016 | Essenmacher |
| 2016/0131205 A1 | 5/2016 | Essenmacher |
| 2016/0131206 A1 | 5/2016 | Essenmacher |
| 2016/0160941 A1 | 6/2016 | Green et al. |

* cited by examiner

SELECTABLE ONE-WAY CLUTCH

The present invention claims the benefit of Japanese Patent Application No. 2015-023858 filed on Feb. 10, 2015 with the Japanese Patent Office, the disclosure of which is incorporated herein by reference in its entirety.

BACKGROUND

Field of the Invention

Preferred example relates to the art of a selectable one-way clutch adapted to selectively enable torque transmission therethrough by rotating a selector member.

Discussion of the Related Art

One example of the selectable one-way clutch of this kind is described in Japanese Patent Publication No. 4887941. In the selectable one-way clutch taught by Japanese Patent Publication No. 4887941, pockets are formed on one of first engagement member and a second engagement member, and notches are formed on the other engagement member. A strut is individually held in each of the pocket in a pivotal manner, and each of the each strut is pushed up to be brought into engagement with the notch to transmit torque thereto. A slide member having through holes for letting through the struts is interposed between the engagement members while being allowed to rotate relatively with the engagement members. In order to rotate the slide member, an actuator is connected to a protrusion of the slide member.

According to the teachings of Japanese Patent Publication No. 4887941, the actuator comprises a plunger connected to the protrusion of the slide member to rotate the slide member by a linear motion thereof, and a piston pushing the plunger in an axial direction. In order to avoid interference between the actuator and the slide member, the actuator is disposed on radially outer side of the slide member. Consequently, a radial dimension between a rotational center of the slide member and the protrusion thereof connected to the plunger of the actuator has to be enlarged. In the selectable one-way clutch taught by Japanese Patent Publication No. 4887941, the struts are allowed to be pushed up to be brought into engagement with the notches by rotating the slide member to an engagement position at which the through holes are individually overlapped with the pockets and the notches, and the struts are pushed into the pockets by rotating the slide member to a disengagement position at which the through holes are individually displaced from the pockets and the notches. To this end, a rotational angle of the slide member between the engagement position and the disengagement position is determined by radial positions and dimensions of the through holes, pockets, and notches. Meanwhile, a stroke of the actuator required to rotate the slide member between the engagement position and the disengagement position is determined by the rotational angle of the slide member, and a radial distance of the slide member between the rotational center and the protrusion connected to the plunger of the actuator. That is, according to the teachings of Japanese Patent Publication No. 4887941, a radial dimension of the slide member is rather large and hence a long stroke of the actuator is required. For this reason, a large actuator is required in the selectable one-way clutch taught by Japanese Patent Publication No. 4887941.

SUMMARY OF THE INVENTION

Aspects of preferred example has been conceived noting the foregoing technical problems, and it is therefore an object of the preferred example is to downsize a selectable one-way clutch by downsizing an actuator.

Preferred embodiment relates to a selectable one-way clutch, comprising: a selector member that is rotated at a predetermined angle between an engagement position and a disengagement position; and an actuator that reciprocates linearly along a tangential line of a circumference of the selector member to rotate the selector member to the engagement position and to the disengagement position. In order to achieve the above-explained objective, according to the preferred example, the actuator is provided with an actuation member that is offset from the selector member in a direction along a rotational center axis of the selector member to actuate along the tangential line of the circumference of the selector member, and the selectable one-way clutch is further provided with an arm connecting the actuation member and the selector member to rotate the selector member by a linear motion of the actuation member.

The selectable one-way clutch further comprises a body assembly in which the selector member is held while being allowed to rotate therein. In addition, the actuator is offset from the body assembly in the direction along the rotational center axis of the selector member in such a manner to situate at least a portion of the actuator radially inner side of an outer circumference of the body assembly.

The selectable one-way clutch further comprises: a stationary member; a rotatable member being opposed to the stationary member coaxially therewith, that is halted in the engagement position not to rotate in both forward and backward directions, and that is allowed to rotate in the disengagement position in both forward and backward directions; a gear unit comprising a plurality of gears, in which one of the gears is connected to the rotatable member; and a side member as a structural element of a vehicle that is situated in an opposite side of the gear unit across the stationary member and the rotatable member. In addition, the actuator is offset from a rotary plane of the selector member toward the gear unit side.

The selector member comprises a tab protruding radially outwardly, and the tab is connected to the arm in a pivotal and slidable manner through an arcuate contact face or a spherical contact face formed on at least any of the tab and the arm.

In addition, a connection between the tab and the arm may be situated on the rotary plane of the selector member. According to a modified example, the selector member comprises a tab protruding radially outwardly, and an oval hole formed on the tab whose diameter crossing a rotational center of the selector member is longer than a shorter diameter thereof perpendicular thereto. In addition, a surface of the arm facing in a direction along the shorter diameter of the oval hole is rounded to be brought into contact to an inner edge of the oval hole, and the arm is reciprocated linearly by the actuator in the direction along the shorter diameter of the oval hole. According to another modified example, the selector member also comprises a tab protruding radially outwardly. In addition, one end of the arm is held in the tab while being allowed to roll therein, the other end of the arm is supported by a supporting member in a pivotal manner, and an intermediate portion of the arm is held in a through hole of the actuation member while being allowed to roll therein.

In the selectable one-way clutch, the selector member is rotated by a linear motion of the actuator. However, according to the preferred example, the actuator is offset from the selector member in a direction along a rotational center axis of the selector member. For this reason, the actuator may be situated close to the rotational center axis of the selector member while avoiding an interference with the selector member and so on. Since the actuator is thus situated close to the rotational center axis of the selector member, the connection between the actuator and the arm connecting the actuator and the tab of the selector member may be situated close to the rotational center axis of the selector member. Consequently, a required stroke of the actuator to rotate the selector member between the engagement position and the disengagement position may be shortened to downsize the actuator. In addition, since the actuator is arranged without being overlapped with the selector member in the radial direction, an outer dimension of the selectable one-way clutch may be reduced to downsize the selectable one-way clutch.

In the body assembly of the selectable one-way clutch, the stationary member is selectively brought into engagement with the rotatable member by rotating the selector member. According to the preferred example, the body assembly is disposed between the gear unit and the side member, and the actuator is offset from the selector member toward the gear unit. According to the preferred example, therefore, the selectable one-way clutch and the gear unit may be situated closer to the side member without causing interference between the actuator and the side member. For this reason, the selectable one-way clutch may be fit into the vehicle easily.

According to the preferred example, the tab of the selector member is rotated around the rotational center of the selector member, while the arm is reciprocated parallel to the tangential line of the selector member. However, since the tab of the selector member is connected to the arm in a pivotal and slidable manner through the arcuate contact face or the spherical contact face formed on any of the tab and the arm, the connection between the tab and the arm can be prevented from being subjected to a bending load or stress. For this reason, friction between the tab and the arm can be reduced so that the selector member and the actuator are allowed to move smoothly while limiting damages thereon.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

The selectable one-way clutch (to be abbreviated as the "SOWC" hereinafter) may be applied to a power transmission unit of automobiles. To this end, the SOWC is selectively brought into engagement and disengagement by rotating a selector member at a predetermined degree by a linear reciprocating motion of an actuator.

Figure 1:
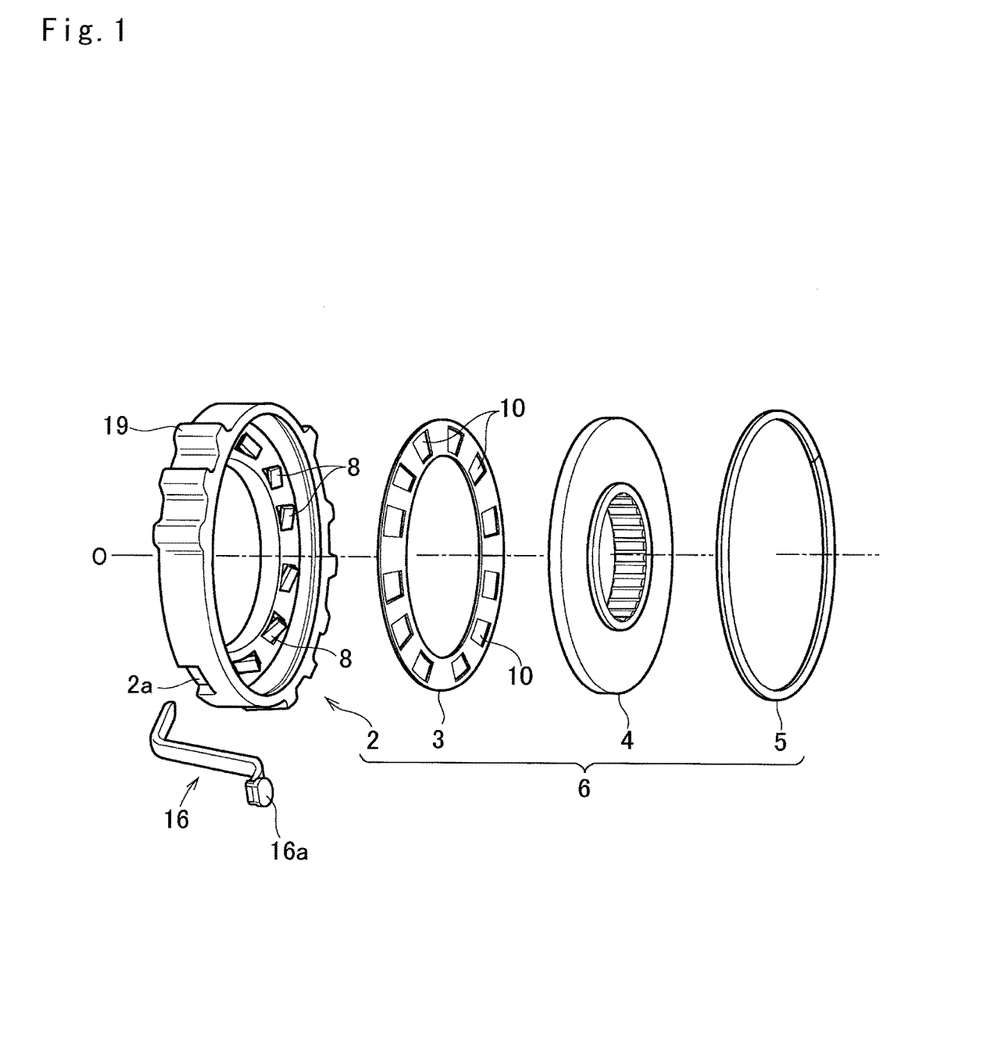
FIG. 1 is an exploded view of the selectable one-way clutch according to the preferred example.

Referring now to FIG. 1, there are shown each part of a body assembly 6 of the SOWC 1 in detail. As shown in FIG. 1, the body assembly 6 of the SOWC 1 comprises a pocket plate 2 serving as the claimed stationary member, a selector plate 3 serving as the claimed selector member, and a notch plate 4 serving as the claimed rotatable member. The pocket plate 2 comprises an outer cylinder and an annular plate formed along an inner circumference of the cylinder. The selector plate 3 and the notch plate 4 are held in the cylinder in the order shown in FIG. 1, and a snap ring 5 is fitted into a clearance between an outer circumference of the notch plate 4 and an inner circumference of the cylinder of the pocket plate 2 to close the pocket plate 2.

Figure 2A:
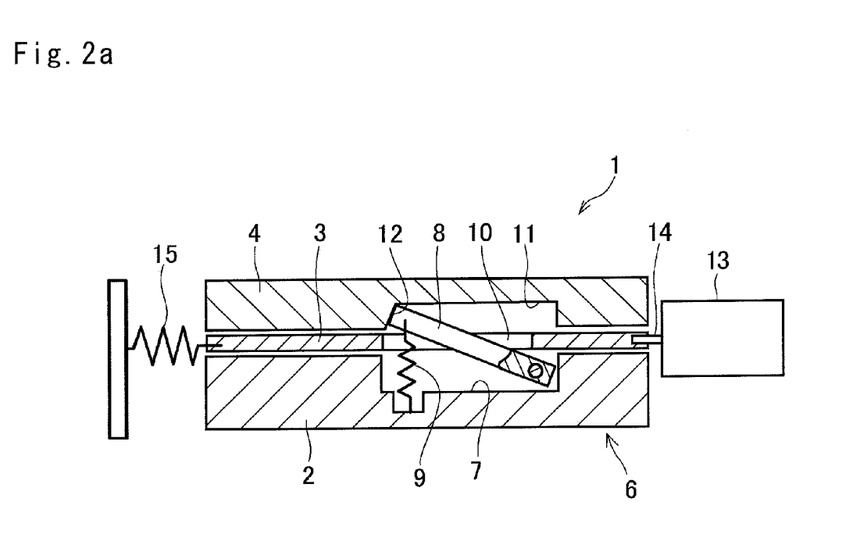
FIG. 2a is a partial cross-sectional view showing the selectable one-way clutch in engagement.
Figure 2B:
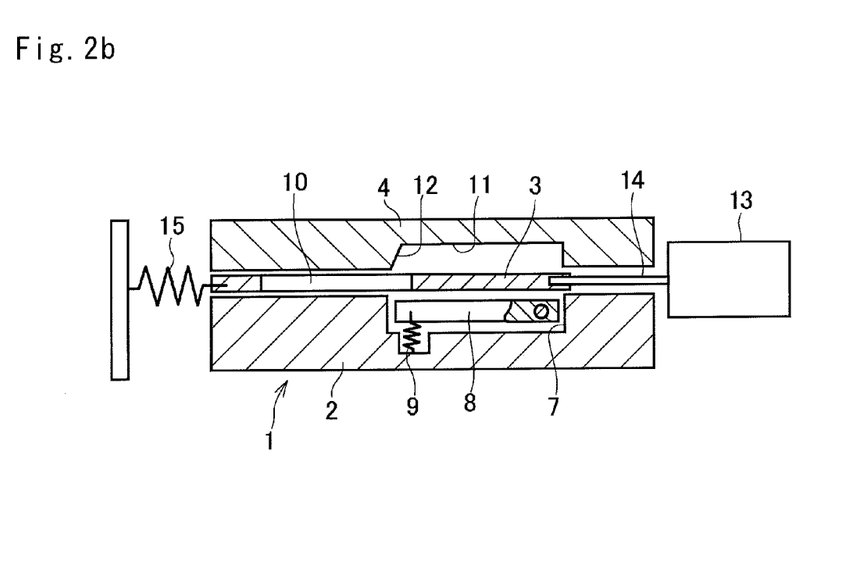
FIG. 2b is a partial cross-sectional view showing the selectable one-way clutch in disengagement.

Turning to FIGS. 2a and 2b, there is partially shown a cross-section of the SOWC 1 thus assembled. As illustrated in FIGS. 2a and 2b, a plurality of pockets (or depressions) 7 are formed in a circular manner on a face of the annular plate of the pocket plate 2 being opposed to the notch plate 4, and a rectangular strut 8 is individually held in each pocket 7 in a pivotal manner around one end thereof as a fulcrum. In order to push up the other end of the strut 8 toward the notch plate 5, a spring 9 is interposed between one end of the strut 8 and a bottom of the pocket 7.

The selector plate 3 is an annular member having similar dimensions as the annular plate of the pocket plate 2, and apertures 10 are formed on the selector plate 3 in a circular manner and in a same number as the pockets 7. As shown in FIG. 2a, when the selector plate 3 is rotated in the pocket plate 2 to an engagement position at which the apertures 10 are individually overlapped with each of the pockets 7, said other end (to be called the "leading end" hereinafter) of each strut 8 is allowed to be pushed up by the spring 9 to be brought into engagement with an after-mentioned notch 11 of the notch plate 4. By contrast, when the selector plate 3 is rotated to a disengagement position at which the apertures 10 are individually displaced from each of the pockets 7, each strut 8 is pushed into the pocket 7 by the selector plate 3 as shown in FIG. 2(b).

The notch plate 4 is also an annular member, and the notches 11 are formed on a face of the notch plate 4 facing to the pocket plate 2 in a circular manner and in the same number as the pockets 7. When the leading end of the strut 8 is pushed into the notch 11 through the aperture 10, the leading end of the strut 8 is brought into abutment to an engagement wall 12.

In order to rotate the selector plate 3 between the positions shown in FIGS. 2a and 2b, the SOWC 1 is provided with an actuator 13. The actuator 13 comprises a plunger 14 serving as the claimed actuation member that is actuated linearly by an electromagnetic force or a hydraulic pressure. According to the example shown in FIGS. 2a and 2b, a solenoid actuator is employed as the actuator 13, and the plunger 14 is constantly pushed by a spring 15. That is, the plunger 14 is elastically pushed out of the actuator 13 by the spring 15 by stopping current supply to the actuator 13 to rotate the selector plate 3 to the disengagement position shown in FIG. 2b. By contrast, the plunger 14 is pulled into the actuator 13 against the elastic force of the spring 15 by energizing the actuator 13 to rotate the selector plate 3 to the engagement position shown in FIG. 2a. Here, it is to be noted that FIGS. 2a and 2b are merely schematic illustrations for explaining a principle of rotating the selector plate 3 by the actuator 13, therefore, an actual structure connecting the actuator 13 and the selector plate 3 is different from that shown in FIGS. 2a and 2b. Specifically, as described later, the spring 15 is fitted onto the plunger 15 in such a manner to push a leading end of the plunger 14.

Figure 3:
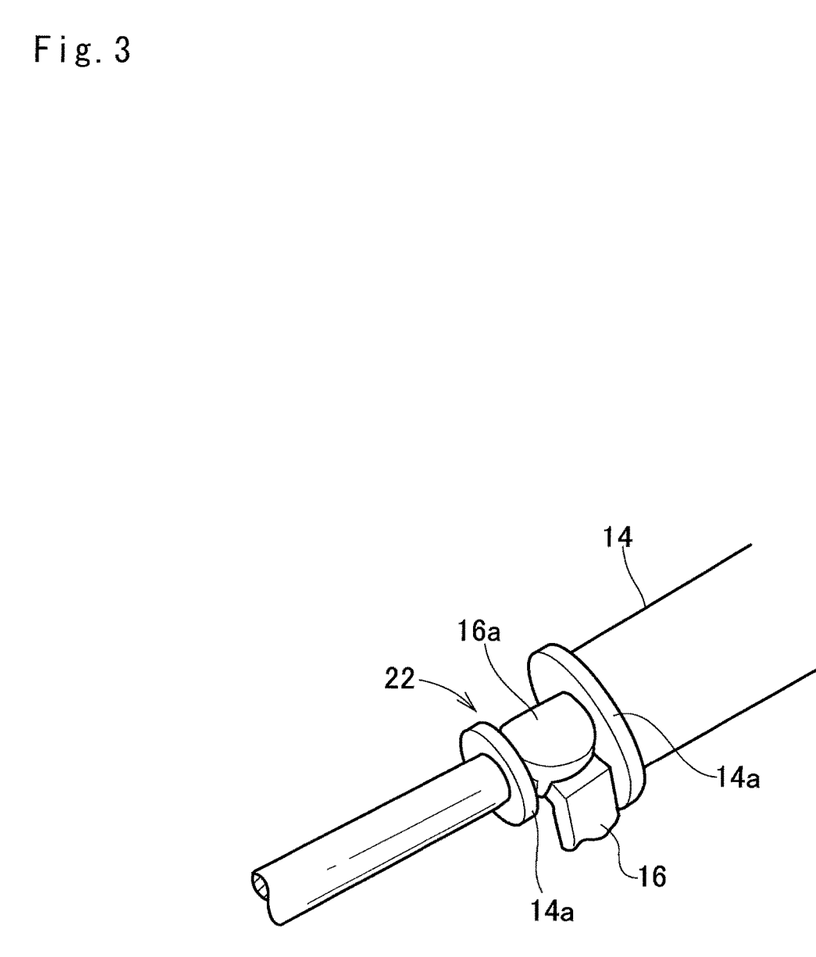
FIG. 3 is a partial perspective view showing a connection between an arm and a plunger.

Turning back to FIG. 1, the selector plate 3 and the actuator 13 are connected through an arm 16. Specifically, as illustrated in FIG. 1, the arm 16 is a cranked rod member. One of the end portions of the arm 16 is inserted into a through hole 2a of the pocket plate 2 from outside to be connected to the selector plate 3 in such a manner to be rotated integrally therewith. An intermediate portion of the arm 16 is bent to extend parallel to the cylinder of the pocket plate 2, and the other end of the arm 16 is bent radially outwardly at a point further than the cylinder of the pocket plate 2. In addition, a semi-circular piece 16a is attached to the other leading end of the arm 16. As illustrated in FIG. 3, the semi-circular piece 16a is disposed between a pair of collars 14a, and rotated around the cylinder of the pocket plate 2 by a linear motion of the plunger 14 of the actuator 13. Consequently, the arm 16 is rotated to move the selector plate 3 to the aforementioned engagement position or the disengagement position. In this situation, although the semi-circular piece 16a is pushed by a linear motion of the actuator 14 through the flat collar 14a, friction between the semi-circular piece 16a and the collar 14a may be absorbed by a round edge of the semi-circular piece 16a.

Figure 4:
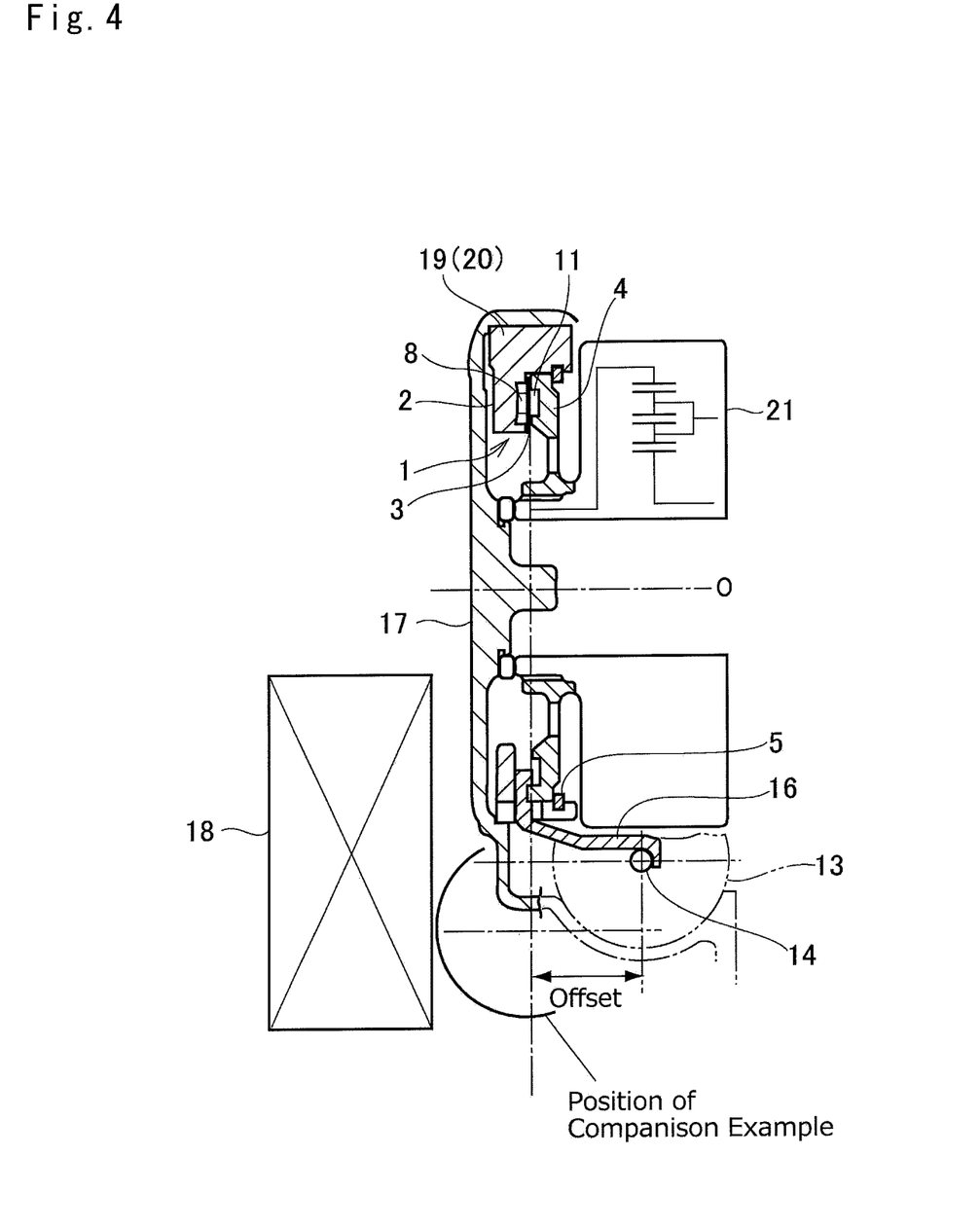
FIG. 4 is a cross-sectional view of the selectable one-way clutch according to the preferred example.

Turning to FIG. 4, there is shown an example to apply the SOWC 1 thus structured in a vehicle. In the example shown in FIG. 4, specifically, the SOWC 1 is arranged in a rear cover 17 of a transaxle disposed in the vicinity of a side member 18 as a structural element of the vehicle.

The body assembly 6 of SOWC 1 is attached to the rear cover 17 by engaging a spline 19 shown in FIG. 1 formed around the cylinder of the pocket plate 2 with a spline 20 formed inside of the rear cover 17. A gear unit 21 as a part of the transaxle is arranged adjacent to the SOWC 1 in the rear cover 7. For example, a planetary gear unit comprising a plurality of rotary elements may be used as the gear unit 21. As described, the notch plate 4 is an annular member, and a predetermined gear (not shown) of the gear unit 21 is connected to an inner circumference of the notch plate 4. That is, in the example shown in FIG. 4, the SOWC 1 serves as a brake for selectively halting a rotation of the predetermined gear of the gear unit 21 in a predetermined direction.

As described, the leading end of the arm 16 to which the semi-circular piece 16a is attached is situated radially outer side of the body assembly 6 and an inner side in the rear cover 17 than the body assembly 6, and the plunger 14 of the actuator 13 is connected to the leading end of the arm 16.

Figure 5:
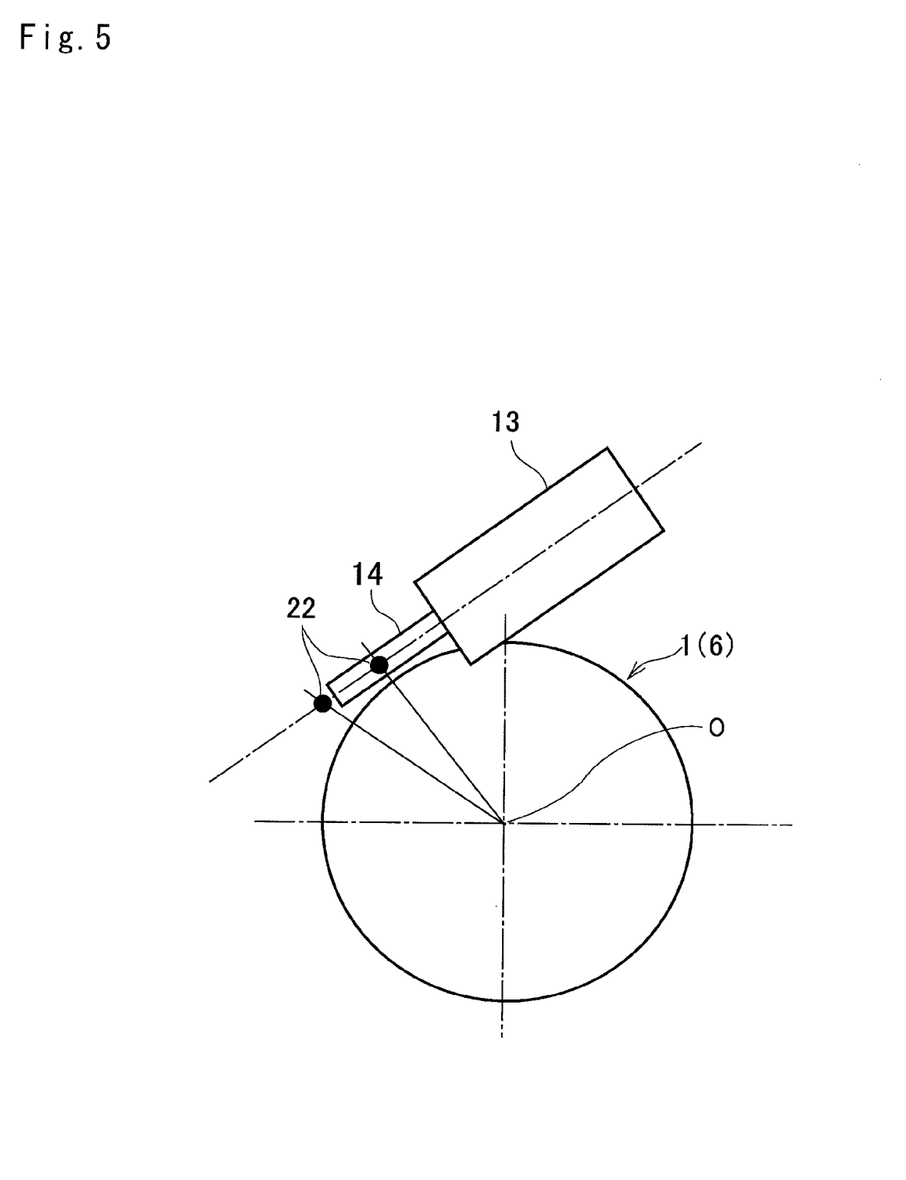
FIG. 5 is a schematic illustration showing positions of a body assembly of the selectable one-way clutch and the actuator.

According to the preferred example, the actuator 13 is offset axially inwardly from the body assembly 6 of the SOWC 1 to be situated on radially outside of the gear unit 21. Turning to FIG. 5, there is shown a positional relation between the actuator 13 and the body assembly 6 of the SOWC 1. In FIG. 5, a solid circle represents a position of an outer circumference of the body assembly 6 of the SOWC 1, and this solid circle is congruent with a circle around a rotational center of the selector plate 3. As shown in FIG. 5, the actuator 13 is arranged along a tangential line of the solid circle while being offset from the body assembly 6 of the SOWC 1 in a direction to be isolated away from the rear cover 7. In addition, an outer diameter of the gear unit 21 is smaller than that of the body assembly 6 of the SOWC 1. For these reasons, the actuator 13 may be partially situated radially inner side of the outer circumference of the body assembly 6 of the SOWC 1 represented by the solid circle in FIG. 5. Thus, according to the preferred example, the actuator 13 is offset in the axial direction while being partially situated radially inner side of the outer circumference of the body assembly 6 of the SOWC 1 without being overlapped therewith. According to the preferred example, therefore, a distance between a radial position of a connection 22 connecting the plunger 14 to the arm 16 from a rotational center axis O is reduced in comparison with that of a case in which the actuator 13 is overlapped with the outer circumference of the body assembly 6 of the SOWC 1. An actuation distance of the plunger 14 to rotate the selector plate 3 between the engagement position and the disengagement position is proportional to the radial distance between the connection 22 and the center axis O. That is, according to the preferred example, the connection 22 may be situated closer to the center axis O to reduce a required stroke of the plunger 14 of the actuator 13, and hence the actuator 13 as well as the SOWC 1 and the transaxle may be downsized.

Turning back to FIG. 4, there is shown a position of the actuator 13 according to a comparison example that is overlapped with the outer circumference of the body assembly 6 of the SOWC 1. As can be seen from FIG. 4, an outer dimension of the SOWC 1 including the actuator 13 may be entirely downsized. In addition, an axial length of the SOWC 1 including the actuator 13 may also be shortened so that an axial end of the transaxle may be situated closer to the side member 18 or overlapped in a vertical direction with the side member 18. For these reasons, an available space of the vehicle may be ensured sufficiently and hence the transaxle may be fitted into the vehicle easily.

Figure 6A:
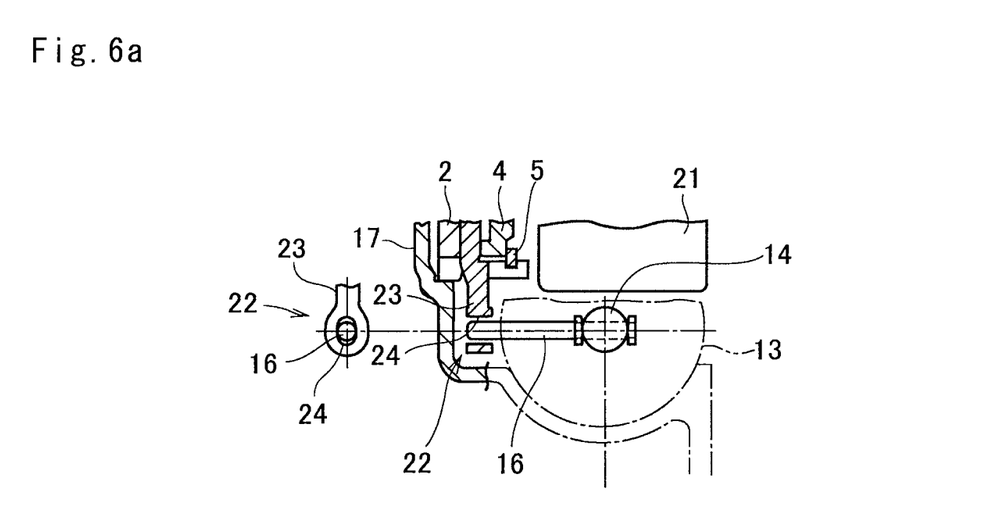
FIG. 6a is a partial cross-sectional view showing a modified example of the connection between the arm and a tab from an axial direction of the actuator.

Here will be explained a modified example of reducing friction resulting from the above-explained offset of the actuator 6 in the axial direction with reference to FIGS. 6a and 6b. According to the example shown in FIGS. 6a and 6b, the arm 16 is allowed to rotate together with the selector plate 3 while being allowed to slide relatively with the selector plate in other direction. In this modified example, the selector plate 3 is provided with a tab 23 having an oval hole 24. Specifically, the tab 23 is formed on or attached to an outer circumference of the selector plate 3 to protrude radially outwardly, and a diameter of the oval hole 24 along an axis thereof crossing the rotational center of the selector plate 3 is longer than a shorter diameter thereof perpendicular thereto.

The arm 16 is attached to the plunger 14, and a leading end of the arm 16 is inserted into the oval hole 24 of the tab 23. In addition, the leading end of the arm 16 is rounded to reduce a diameter of a circular cross-section thereof smaller than a width (or shorter than a short axis) of the oval hole 24. Thus, the arm 16 is connected to the tab 23 in such a manner to be reciprocated integrally therewith in the rotational direction of the selector plate 3 while being allowed to move relatively with the tab 23 in the axial direction (i.e., in a longitudinal direction). According to the example shown in FIGS. 6a and 6b, the connection 22 between the tab 23 and the arm 16 is also situated in radially outer side of the selector plate 3 or on a rotary face of the selector plate 3.

Figure 6B:
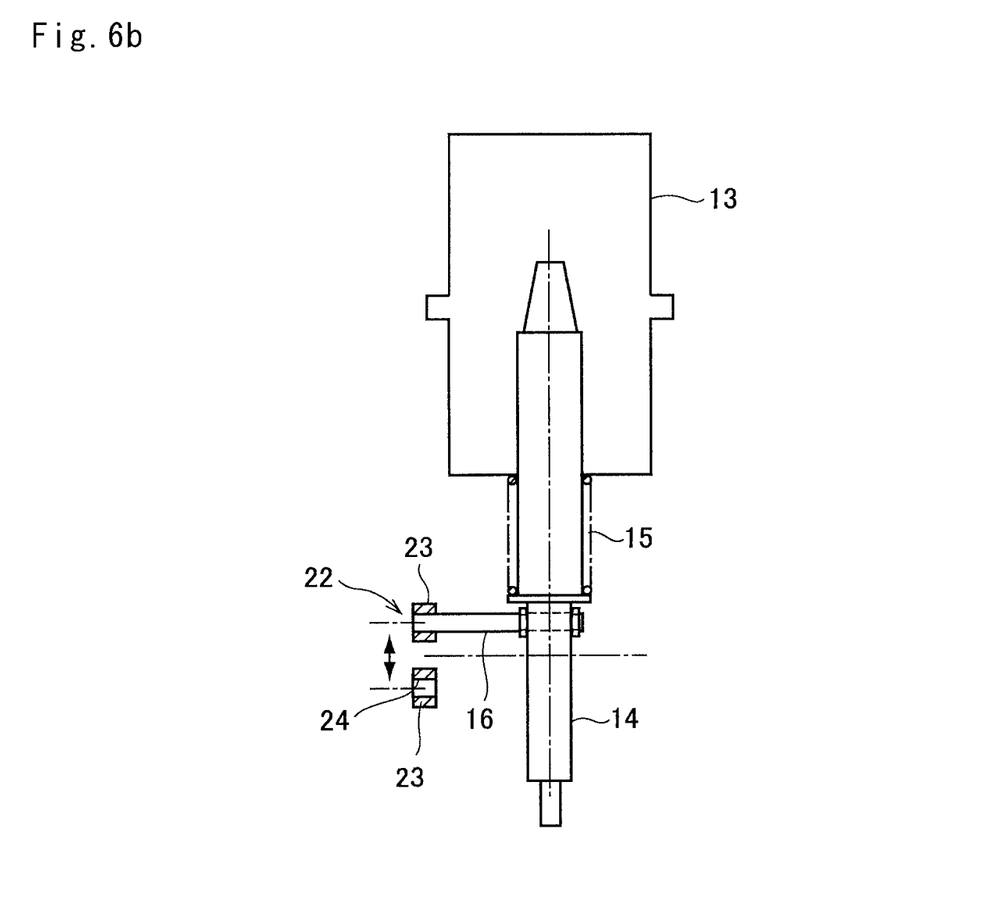
FIG. 6b is a partial cross-sectional view showing a modified example of the connection between the arm and the tab from above.

When the current supply to the actuator 13 is stopped, the plunger 14 and the arm 16 connected thereto are pushed downwardly in FIG. 6b by the spring 15. Consequently, the tab 23 to which the leading end of the arm 16 is inserted is also moved downwardly in FIG. 6b. In this situation, the arm 16 is moved linearly together with the plunger 14 along the tangential line of the selector plate 3, while the tab 23 is rotated around the rotational center axis O of the selector plate 3. However, the leading end of the arm 16 is rounded and allowed to rotate relatively with the oval hole 14 and reciprocate axially through the oval hole 24. According to the example shown in FIGS. 6a and 6b, therefore, the arm 16 and the tab 23 are prevented from being subjected to a bending load or stress. In addition, since the leading end of the arm 16 and an inner edge of the oval hole 24 are rounded, an outer face of the leading end of the arm 16 is brought into linear contact to the inner edge of the oval hole 24. Therefore, a friction resulting from a relative movement between the arm 16 and the tab 23 in different directions can be reduced. For these reasons, the selector plate 3 and the plunger 14 are allowed to move smoothly while limiting damages thereon.

Figure 7A:
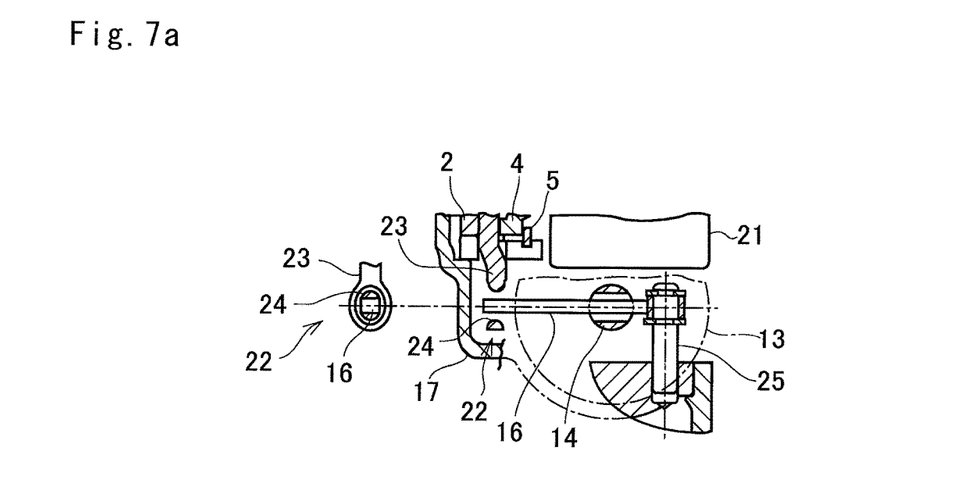
FIG. 7a is a partial cross-sectional view showing another modified example of the connection between the arm and the tab from an axial direction of the actuator.
Figure 7B:
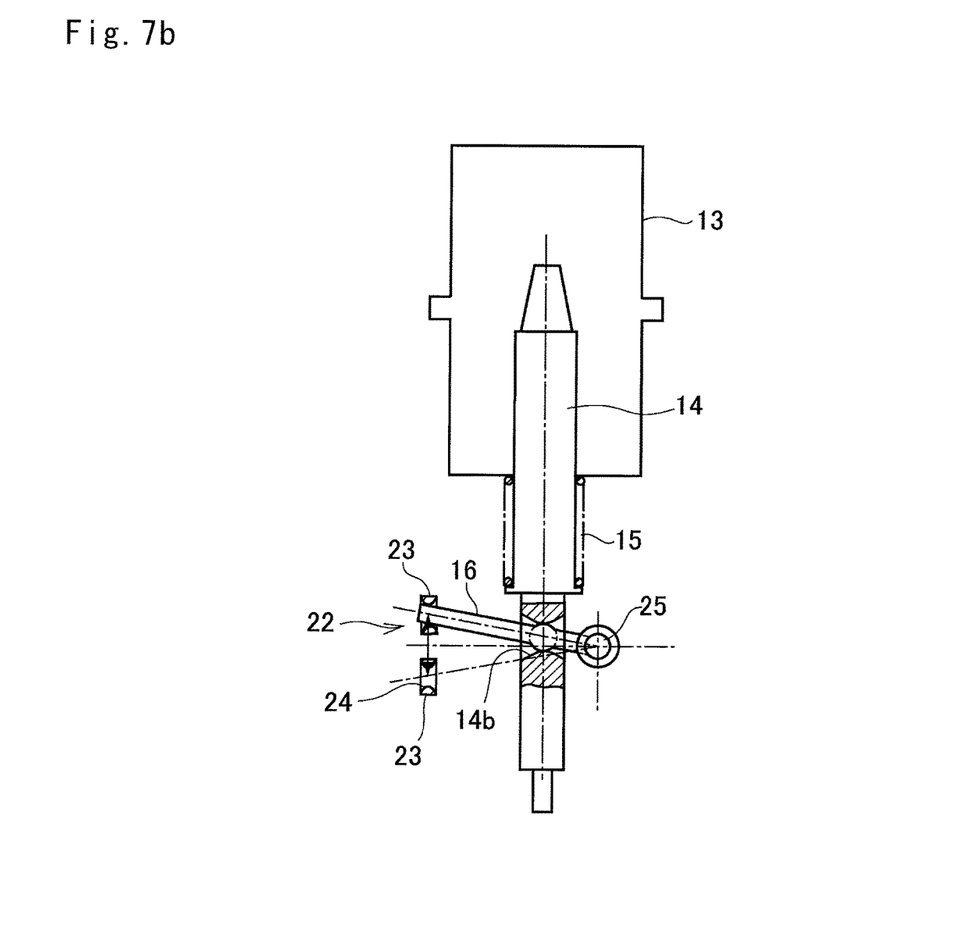
FIG. 7b is a partial cross-sectional view showing another modified example of the connection between the arm and the tab from above.

Turning to FIGS. 7a and 7b, there is shown another modified example of reducing a stroke of the plunger 14 in comparison with that of the tab 23 utilizing a principle of leverage. According to the example shown in FIGS. 7a and 7b, a supporting pin 25 serving as the claimed supporting member is arranged perpendicular to the plunger 14 on the opposite side of the tab 23 across the plunger 14, and the arm 16 is attached to the supporting pin 25 in a pivotal manner. Specifically, the plunger 14 is provided with a through hole 14b penetrating through an intermediate portion of the plunger 14 in the radial direction. The arm 16 is inserted into the through hole 14b, and the leading end of the arm 16 is inserted into the oval hole 24 of the tab 23. An inner face of the though hole 14b is curved in such a manner to protrude at its intermediate portion so that the outer face of the arm 16 is brought into linear contact to the inner face of the through hole 14b at the diametrically reduced intermediate portion. Likewise, the leading end of the arm 16 and an inner edge of the oval hole 24 are rounded so that the leading end of the arm 16 is brought into linear contact to the inner edge of the oval hole 24. The remaining structure of the example shown in FIGS. 7a and 7b are similar to those of the example shown in FIGS. 6a and 6b.

According to the example shown in FIGS. 7a and 7b, the arm 16 pivots around the supporting pin 25 in response to a linear movement of the plunger 14 so that the tab 23 connected to the leading end of the arm 16 is moved in the vertical direction. According to this example, a distance between the supporting pin 25 and the connection 22 is longer than that between the supporting pin 25 and the plunger 14. That is, a stroke of the connection 22 (or the tab 23) is longer than that of the plunger 14. For this reason, the stroke of the actuator 13 can be reduced to rotate the tab 23 or the selector plate 3 at a required rotational angle so that the actuator 13 can be downsized.

According to the example shown in FIGS. 7a and 7b, the tab 23 is rotated around the rotational center axis O of the selector plate 3, while the arm 16 is pivoted around the supporting pin 25. That is, a moving direction of the tab 23 of the connection 22 is different from that of the arm 16. However, as the example shown in FIGS. 6a and 6b, the leading end of the arm 16 is also allowed to move relatively with the tab 23 so that the arm 16 and the tab 23 integrated with the selector plate 3 may also be prevented from being subjected to a bending load or stress.

Especially, according to the example shown in FIGS. 7a and 7b, the arm 16 is not allowed to reciprocate linearly but allowed to pivot around the supporting pin 25. That is, a relative angle between the arm 16 and the tab 23 within a plane where the arm 16 is pivoted is altered. According to this example, the inner edge of the oval hole 24 of the tab 23 is rounded in such a manner to realize a linear contact to the outer face of the leading end of the arm 16 inserted thereinto so that the leading end of the arm 16 is allowed to move vertically without being subjected to any stress. In addition, a sliding resistance between the leading end of the arm 16 and the inner edge of the oval hole 24 may be reduced. Likewise, since the inner face of the though hole 14b is curved into a convex curve, the arm 16 is allowed to roll smoothly on the inner face of the though hole 14b in response to the reciprocation of the plunger 14. That is, a sliding resistance between the intermediate portion of the arm 16 and the inner face of the though hole 14b may also be reduced. According to the example shown in FIGS. 7a and 7b, therefore, the selector plate 3 and the plunger 14 may be prevented from being subjected to a bending load or stress so that the selector plate 3 and the plunger 14 are allowed to move smoothly while limiting damages thereon.

Figure 8A:
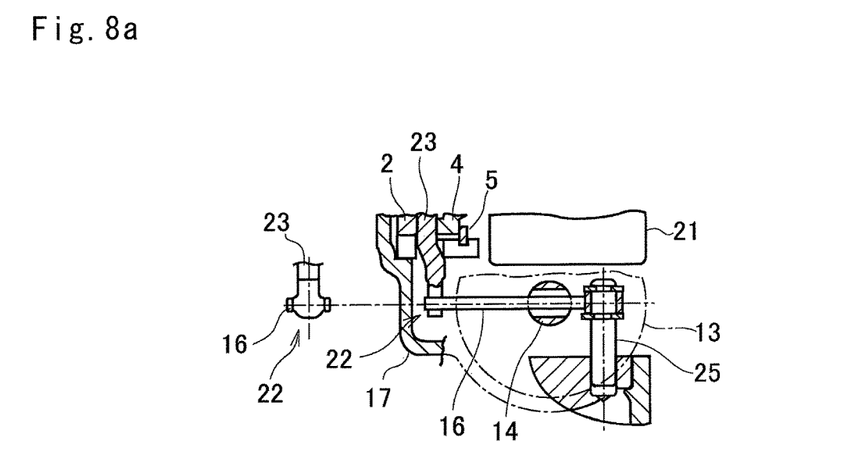
FIG. 8a is a partial cross-sectional view showing still another modified example of the connection between the arm and the tab from an axial direction of the actuator.
Figure 8B:
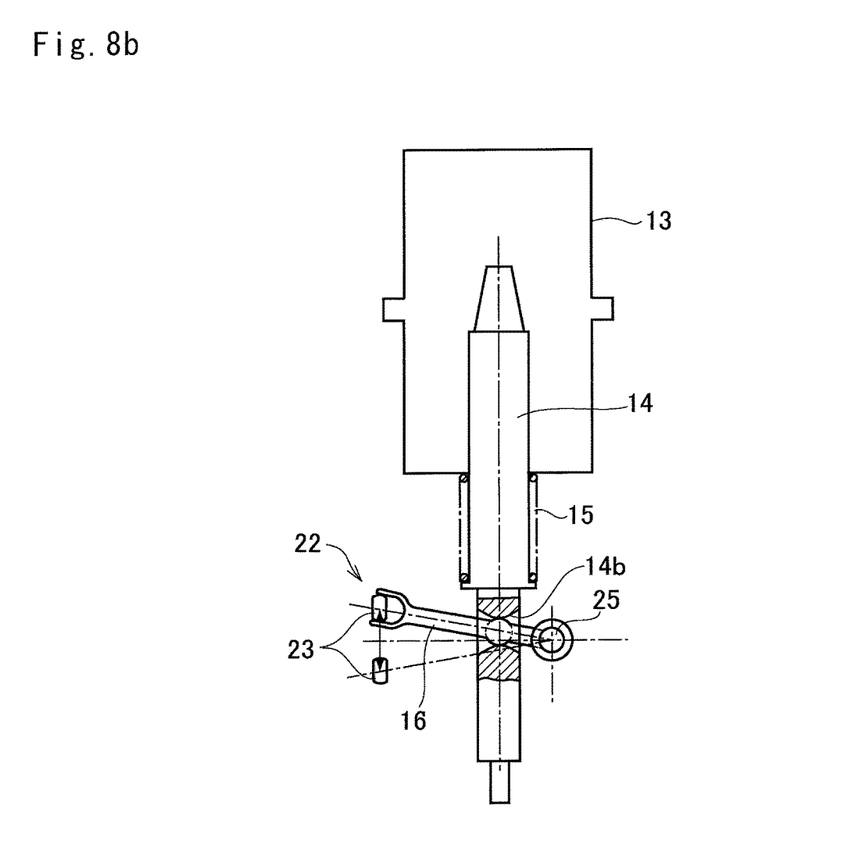
FIG. 8b is a partial cross-sectional view showing still another modified example of the connection between the arm and the tab from above.

Turning to FIGS. 8a and 8b, there is shown still another modified example in which the leading end of the tab 23 is clamped by the leading end of the arm 16. According to the example shown in FIGS. 8a and 8b, specifically, a leading end of the tab 23 is shaped into a circular plate expanding parallel to a plane the rotational center axis O of the selector plate 3. In addition, an outer circumferential face of the circular plate of the tab 23 is rounded to protrude not only in a circumferential direction but also in a thickness direction. On the other hand, the leading end of the arm 16 is divided into two to hold the circular plate of the tab 23 therein. That is, the connection 22 between the tab 23 and the arm 16 are moved together in the reciprocating direction of the plunger 14 (i.e., the vertical direction in FIG. 8b), but the tab 23 and the arm 16 are allowed to move relatively from each other in other directions. The remaining structure of the example shown in FIGS. 8a and 8b are similar to those of the example shown in FIGS. 7a and 7b.

Thus, according to the example shown in FIGS. 8a and 8b, the tab 23 and the arm 16 are allowed to move relatively from each other at the connection 22. According to the example shown in FIGS. 8a and 8b, therefore, the selector plate 3 is allowed to rotate by the actuator 13 without applying a bending load or stress to the tab 23 and the arm 16 moved in different directions. For this reason, the selector plate 3 and the plunger 14 are allowed to move smoothly while limiting damages thereon.

Lastly, it will be apparent to those skilled in the art that various modifications and variations may be made to the disclosed selectable one-way clutch within the spirit of the present invention.

What is claimed is:
1. A selectable one-way clutch, comprising:
   a selector member that is rotated at a predetermined angle between an engagement position and a disengagement position; and an actuator that reciprocates linearly along a tangential line of a circumference of the selector member to rotate the selector member to the engagement position and to the disengagement position;
wherein the actuator comprises an actuation member that is offset from the selector member in a direction along a rotational center axis of the selector member to actuate along the tangential line of the circumference of the selector member; and
further comprising an arm connecting the actuation member and the selector member to rotate the selector member by a linear motion of the actuation member,
wherein the arm is a crank rod member with one rounded surface.

2. The selectable one-way clutch as claimed in claim 1, further comprising:
a body assembly in which the selector member is held while being allowed to rotate therein; and
wherein the actuator is offset from the body assembly in the direction along the rotational center axis of the selector member in such a manner to situate at least a portion of the actuator radially inner side of an outer circumference of the body assembly.

3. The selectable one-way clutch as claimed in claim 1, further comprising:
a stationary member;
a rotatable member being opposed to the stationary member coaxially therewith, that is halted in the engagement position not to rotate in both forward and backward directions, and that is allowed to rotate in the disengagement position in both forward and backward directions;
a gear unit comprising a plurality of gears, in which one of the gears is connected to the rotatable member; and
a side member as a structural element of a vehicle that is situated in an opposite side of the gear unit across the stationary member and the rotatable member;
wherein the actuator is offset from a rotary plane of the selector member toward the gear unit side.

4. The selectable one-way clutch as claimed in claim 1,
wherein the selector member comprises a tab protruding radially outwardly; and
wherein the tab is connected to the arm in a pivotal and slidable manner through an arcuate contact face or a spherical contact face formed on any of the tab and the arm.

5. The selectable one-way clutch as claimed in claim 4, wherein a connection between the tab and the arm is situated on the rotary plane of the selector member.

6. A selectable one-way clutch, comprising:
a selector member that is rotated at a predetermined angle between an engagement position and a disengagement position; and
an actuator that reciprocates linearly along a tangential line of a circumference of the selector member to rotate the selector member to the engagement position and to the disengagement position;
wherein the actuator comprises an actuation member that is offset from the selector member in a direction along a rotational center axis of the selector member to actuate along the tangential line of the circumference of the selector member; and
further comprising an arm connecting the actuation member and the selector member to rotate the selector member by a linear motion of the actuation member,
wherein the selector member comprises a tab protruding radially outwardly, and an oval hole formed on the tab whose diameter crossing a rotational center of the selector member is longer than a shorter diameter thereof perpendicular thereto; and
wherein a surface of the arm facing in a direction along the shorter diameter of the oval hole is rounded to be brought into contact to an inner edge of the oval hole; and
wherein the arm is reciprocated linearly by the actuator in the direction along the shorter diameter of the oval hole.

7. A selectable one-way clutch, comprising:
a selector member that is rotated at a predetermined angle between an engagement position and a disengagement position; and
an actuator that reciprocates linearly along a tangential line of a circumference of the selector member to rotate the selector member to the engagement position and to the disengagement position;
wherein the actuator comprises an actuation member that is offset from the selector member in a direction along a rotational center axis of the selector member to actuate along the tangential line of the circumference of the selector member; and
further comprising an arm connecting the actuation member and the selector member to rotate the selector member by a linear motion of the actuation member,
wherein the selector member comprises a tab protruding radially outwardly, and
wherein one end of the arm is held in the tab while being allowed to roll therein, the other end of the arm is supported by a supporting member in a pivotal manner, and an intermediate portion of the arm is held in a through hole of the actuation member while being allowed to roll therein.

* * * * *